E. SCHOONMAKER.
MECHANICAL MOVEMENT.
APPLICATION FILED OCT. 17, 1910.
1,123,396.
Patented Jan. 5, 1915.
2 SHEETS—SHEET 1.
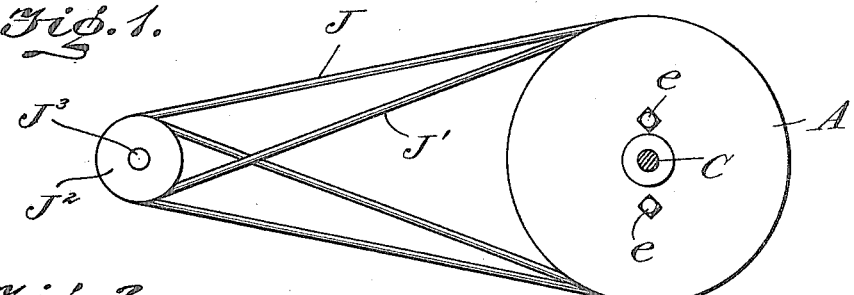
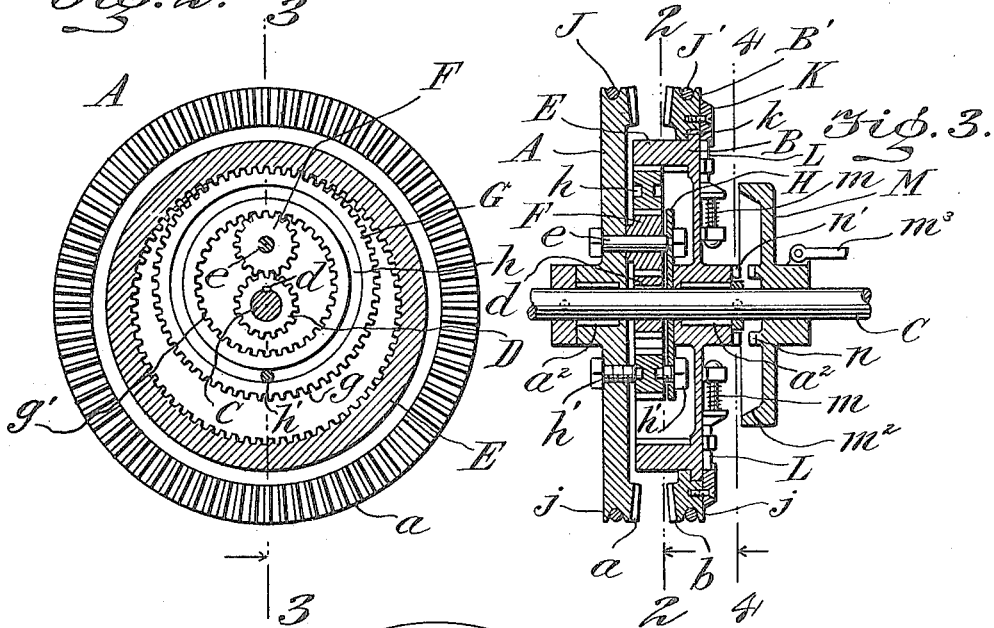
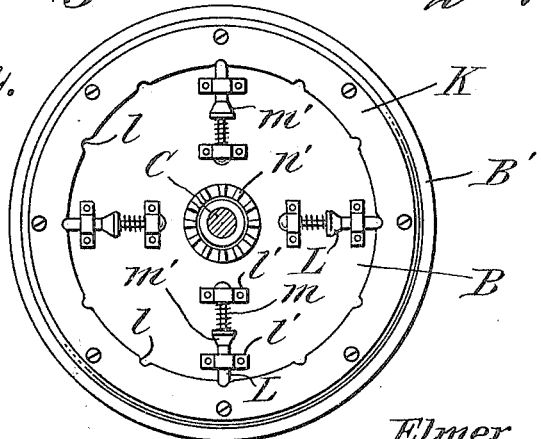
WITNESSES
INVENTOR
Elmer Schoonmaker
BY
ATTORNEYS E. SCHOONMAKER.
MECHANICAL MOVEMENT.
APPLICATION FILED OCT. 17, 1910.
1,123,396.
Patented Jan. 5, 1915.
2 SHEETS—SHEET 2.
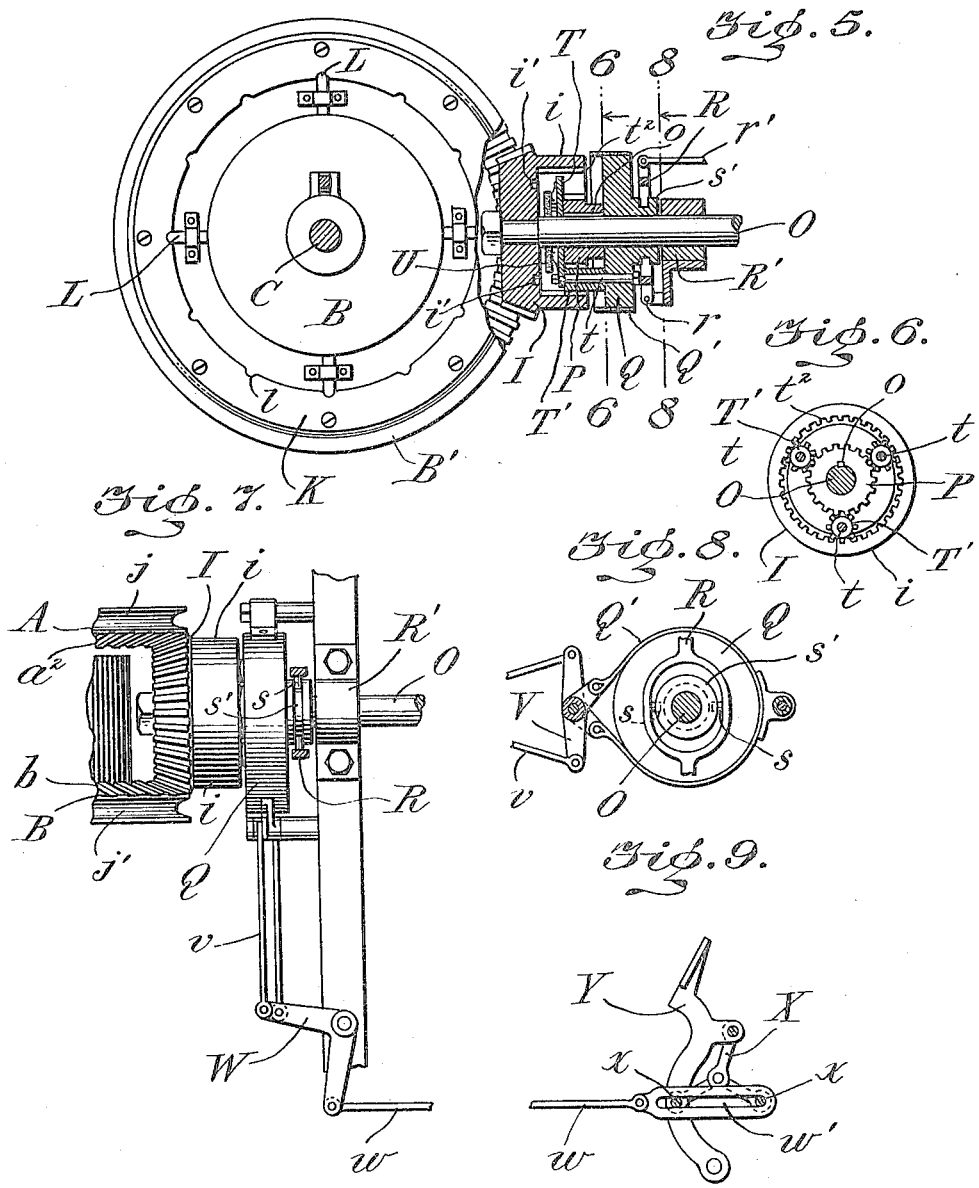
WITNESSES
A. C. Abbott
V. E. Markmann
INVENTOR
Elmer Schoonmaker
BY Griffins Bernhold
ATTORNEYS

UNITED STATES PATENT OFFICE.

ELMER SCHOONMAKER, OF NEW YORK, N. Y.

MECHANICAL MOVEMENT.

1,123,396.  Specification of Letters Patent.  Patented Jan. 5, 1915.

Application filed October 17, 1910. Serial No. 587,374.

*To all whom it may concern:*

Be it known that I, ELMER SCHOONMAKER, a citizen of the United States, residing in the city of New York, borough of Bronx, and State of New York, have invented a certain new and useful Mechanical Movement, of which the following is a specification.

This invention is a mechanical movement capable of use in connection with various kinds of machinery.

The mechanical movement of my invention is employed between a driving part and a part to be driven for the purpose of increasing the speed of said driven part relatively to that of the driving part.

In conjunction with the devices by which the foregoing ends are secured, the invention embodies means whereby the movement may be started and stopped at will, and it embraces, further, means for reversing the direction of rotation of the driven part relative to the driving part.

In the accompanying drawings I have illustrated one practical embodiment of the invention, but the construction shown therein is to be understood as illustrative, only, and not as defining the limits of the invention.

Figure 1 is a side elevation illustrating one practical form of the invention. Fig. 2 is a vertical section on the line 2—2 of Fig. 3. Fig. 3 is a section in the direction of the driven shaft and on the line 3—3 of Fig. 2 looking in the direction of the arrow. Fig. 4 is a section on the line 4—4 of Fig. 3 looking toward the left. Fig. 5 is a side view, partly in vertical section, illustrating another means for operating the movement, which means is adapted to start, stop and reverse the movement at will. Fig. 6 is a cross section on line 6—6 of Fig. 5. Fig. 7 is a plan of part of the apparatus shown in Fig. 5. Fig. 8 is a cross section on the line 8—8 of Fig. 5. Fig. 9 is a detail showing one form of operating means for shifting the clutch mechanism of Fig. 5.

A, B designate two driving members adapted for rotation in opposite directions simultaneously. Said members are mounted loosely on a shaft, C, so as to rotate freely thereon, it being preferred to employ roller bearings, as $a^2$, between shaft, C, and members, A, B. Shaft, C, is provided with a driven member shown in the drawings as a pinion, D, the same being keyed at $d$ to said shaft, C. Driving members, A, B, and driven member, D, are concentric, but intermediate the driven member, D, and driving members, A, B, is a gear train adapted to multiply the speed of driven member, D, relative to driving members, A, B. Said gear train consists of an internal gear, E, a pinion, F, and a double gear, G. Internal gear, E, is in the form of a flange having gear teeth on the inner edge thereof, said flange being integral with driving member, B, as in Fig. 3, or it may be separate from said member and suitably secured thereto, as will be understood. Pinion, F, is mounted on driving member, A, by means of an arbor, $e$, and this pinion, F, meshes directly with driven pinion, D, as in Fig. 2. It will be noted that internal gear, E, rotates with driving member, B, in one direction, whereas pinion, F, is mounted on the other driving member, A, for rotation therewith and in an opposite direction to that of internal gear, E, and member, B. Double gear, G, is intermediate internal gear, E, and pinion, F. According to this invention, the double gear is in eccentric relation to driving and driven parts, A, B, D, and it is shiftable relative to said parts. Said double gear, G, comprises a ring or annulus having teeth, $g$, on the external periphery thereof, and other teeth, $g'$, on the internal periphery thereof, as shown clearly in Fig. 2. The external teeth of the double gear mesh with the teeth of internal gear, E, whereas the internal teeth, $g'$, of said double gear mesh with the external teeth of pinion, F, whereby parts, E, F, on the oppositely rotating driving members, A, B, are operatively connected by double gear, G, with driven gear, D. The shiftable double gear is confined in position relative to member, A, and gears, D, F, by devices which permit said double gear to change its relation to the coöperating parts while retaining said double gear in mesh with internal gear, E, and pinion, F. As shown, said retaining means consists of a plate, H, positioned at one side of gear D, double gear G, and internal gear E, said plate H being positioned between member B and said parts D E G. This plate is connected to driving member, A, by appropriate means, such as by through bolts, only one of which is shown, the through bolt $e$ operating to support pinion F, see Fig. 3. Double gear, G, is provided, also, with annular grooves, $h$, in the respective faces thereof and intermediate the rows of teeth, $g$, $g'$. These grooves receive retaining pins or bolts, $h'$, which are attached to plate, H, and driving member, A, as shown in Fig. 3. The plate and bolts operate to retain double gear in proper relation to driving member, A, but this double gear is not attached rigidly to said driving member for the reason that the retaining bolts permit the gear to change its position relative to said driving member, said double gear meshing at all times with internal gear, E, and pinion, F.

Any appropriate means may be employed for driving members, A, B, in opposite directions simultaneously. As shown, said members are provided on their opposing faces with bevel gears, $a$, $b$, respectively, with which gears is adapted to engage a single driving pinion, I, of the form shown in Figs. 5 and 7. If desired, however, the belt gearing shown in Figs. 1 and 2 may be substituted for the driving bevel pinion, I. In this embodiment of the invention members, A, B, are provided with peripheral grooves, $j$, $j'$, respectively. In the groove, $j$, of member, A, operates a driving belt, J, whereas the groove, $j'$, of member, B, receives a crossed driving belt, J', said belts being operated by appropriate pulleys, one of which is indicated at $J^2$, said pulleys being on a prime shaft, $J^3$.

It is evident that the rotation of bevel gear, I, will operate on bevel gears, $a$, $b$, for the purpose of simultaneously driving members, A, B, in opposite directions and at equal speeds, but the same result may be attained by using the straight and crossed belts, J, J', operated by pulleys, $J^2$, from prime shafts, $J^3$.

At times it is desirable to lock member, B, in a stationary position relative to driven member D and gears E F G, and to drive pinion, D, from member, A, in order to reduce the speed and increase the power. The apparatus shown in Figs. 3 and 4 provides for the operation of the movement to secure the foregoing results. Member, B, is provided with a rim, B', the latter being loosely mounted on the periphery of said member, B. The rim, B', and member, B, are formed with engaging flanges, $k$, shown in Fig. 3, which precludes said rim from displacement in one direction, but movement in the other direction is restrained by face plate, K, bolted to said rim, B', and engaging with one side or face of member, B, whereby rim, B', is mounted loosely on member, B, for rotation idly thereon when the clutch mechanism is operated. Said loose rim, B', is provided with grooves, $j'$, to receive belt, J', and, furthermore, the bevel gear, $b$, is formed on said loose rim, B'. The face plate, K, which is made fast with said loose rim, B', is provided on its inner edge with a series of notches or pockets, $l$, see Fig. 4, and these pockets are engaged normally by locking dogs, L. Said dogs are mounted for slidable movement in appropriate guides, $l'$, fixed on member, B, and the dogs are pressed normally into engagement with the notched face plate, K, by springs, $m$. Said dogs are provided, also, with substantially conical faces, $m'$, and these faces are adapted to be engaged by the beveled face of the rim, $m^2$, on a sliding clutch member, M, the latter being mounted loosely on shaft, C. Said sliding clutch member is adapted to be operated by suitable connections with a hand lever or foot treadle, such as the link, $m^3$. Furthermore, the clutch member is provided on its hub with clutch teeth, $n$, adapted to engage with clutch teeth, $n'$, on the hub portion of driving member, B.

In the position of the parts shown in Fig. 3, clutch member, M, is withdrawn from member, B, so that dogs, L, are impelled by their springs into engagement with notched face plate, K, thus making rim, B', fast with member, B, the teeth, $n$, of said clutch member, M, being free from teeth, $n'$, of member, B, whereby rim, B', rotates with said member, B. When clutch member, M, is moved to the left in Fig. 3, flange, $m^2$, of said clutch member engages with cam faces, $m'$, of dogs, L, and at the same time teeth, $n$, of clutch member, M, engage with teeth, $n'$, of member, B. This results in withdrawing dogs, L, from the notches of plate, K, so that rim, B', is not connected fast with member, B, and clutch member, M, is locked by teeth, $n$, $n'$, to said member, B, whereby clutch member, M, and member, B, are connected rigidly so as to preclude said member, B, from rotation.

The construction shown in Figs. 5 to 9 inclusive of the drawings is adapted for coöperation with bevel gear, I, with a view to starting, stopping and reversing the mechanism at will, and I will now proceed to describe the same in detail.

O designates a shaft on the inner end of which bevel gear, I, is mounted loosely. Said gear is provided with a hollow or chambered hub, $i$, and in the inner face of said gear are pockets or depressions, $i'$.

Secured to shaft, O, is a gear, P, adapted to rotate at all times with said shaft, O, said gear, P, being slidable on the shaft, O. The sliding connection between gear, P, and shaft, O, is secured by a key, $o$, see Fig. 6.

Q designates a disk forming a part of a band brake device, the band being shown at Q'. Said disk, Q, is mounted loosely on shaft, O, for engagement with the hub of gear, P, and said disk is adapted to be moved lengthwise of shaft, O, by a suitable shipper lever, R. Said lever is fulcrumed at its lower end, as at $r$, on a fixed hanger or support, R', through which shaft, O, passes loosely, and to the other end of the shipper lever is connected a link, r', leading to a suitable operating lever or foot treadle (not shown). Shipper lever, R, is provided with inwardly extending pins, s, which connect with the grooved collar, s', of disk, Q, and when the lever is moved in one direction or the other said disk, Q, is operated by the lever to slide gear, P, lengthwise of shaft, O.

T designates a plate which is positioned between gear, P, and the inner face of bevel gear, I. This plate is connected rigidly to disk, Q, by bolts, t, and on these bolts are loosely mounted the reverse gear pinions, T'. Said pinions are normally in mesh with gear, P, and with teeth, $t^2$, forming an internal gear of the hub, i, of bevel gear, I. Plate, T, coöperates with a disk of indurated fiber or other appropriate frictional material, U, adapted to be pressed by said plate, T, into engagement with the inner face of bevel gear, I. Suitable springs are employed for holding disk U in spaced relation to the plate T, as shown in Fig. 5, but when the plate T is moved toward the hub of gear I said springs are adapted to be compressed in order to allow disk U to have frictional contact with the hub of gear I when bolts t enter pockets i'. As shown, the end portions of bolts, t, are adapted to enter pockets or depressions, i', of bevel gear, I, so as to form a mechanical clutch between said bevel gear, I, and disk, Q.

Band brake, Q', is connected at its respective ends to a lever, V, and to the end portions of this lever are pivoted links, v, connected with a bell crank lever, W. This bell crank is provided with a link, w, which may extend to a suitable operating lever, but as shown in Fig. 9, said link, w, is provided with a pivoted end piece having a slot, w', to receive the pins, x, on a sectional jointed hanger, X, pivotally suspended from a treadle, Y, whereby band brake, Q', may be operated to hold disk, Q, stationary. When the parts shown in Fig. 5 are shifted to the left by the operation of shipper lever, R, disk, U, and the ends of bolts, t, are free from engagement with bevel gear, I, so that motion will not be communicated by said gear, I, from shaft, O, to members, A, B. By moving shipper lever, R, toward the left, disk, Q, and gear, P, are correspondingly shifted so that disk, U, will be engaged with bevel gear, I, to start said gear into operation gradually, but by pressing the lever, R, forcibly into position the ends of bolts, t, will be caused to engage with pockets of bevel gear, I, thus making the latter fast with shaft, O, whereby bevel pinion, I, imparts full power to driving members, A, B. Under these conditions, disk, Q, and the reverse gears may be locked fast with pinion, P, so that all the parts will rotate with bevel gear, I, as a unit. To throw the apparatus out of operation or stop the movement, it is only necessary to move shipper lever, R, toward the right in Fig. 5, thus releasing bolts, t, and disk, U, from engagement with bevel gear, I. If desired to reverse the direction of rotation of bevel gear, I, band brake, Q', is applied to disk, Q, for the purpose of holding it stationary, and as gear, P, is fast with shaft, O, said gear will operate reverse gears, T', thereby turning them on their axes and causing said gears, T', to transfer the motion of gear, P, to internal gear, $t^2$, of bevel gear, I, whereby said bevel gear is caused to rotate in an opposite direction to that in which it is driven when clutched to shaft, O.

Having thus fully described the invention, what I claim as new, and desire to secure by Letters Patent is:

1. In a mechanical movement, driving members rotatable simultaneously in opposite directions, an internal gear rotatable with one of said members, a driven member, a double gear in eccentric relation to the axes of rotation of said driving members and meshing with said internal gear, and a pinion carried by one of the driving members and operatively related to the driven member and the eccentrically positioned double gear.

2. In a mechanical movement, a plurality of driving members, an internal gear on one of said members, a pinion carried by the other driving member, a shiftable member in eccentric relation to the axes of rotation of the driving members and the pinion and coöperating with the internal gear and with said pinion for transmitting power from one to the other, and a driven member coöperating with, and adapted to receive energy from, the pinion on the driving member.

3. In a mechanical movement, a plurality of driving members, an internal gear on one of said members, a pinion carried by the other member, a driven pinion in mesh with the pinion on the driving member, and a double gear member meshing with the internal gear and with said pinion on one of the driving members, said double gear member being in eccentric relation to the driving and driven parts and shiftable relatively to one of said driving members and to the driven member.

4. In a mechanical movement, a plurality of oppositely rotating driving parts, a driven part, and a gear train connecting said driven part with the oppositely rotating driving parts, said train of gears including a shiftable gear in eccentric relation to other gears of said train.

5. In a mechanical movement, a plurality of oppositely rotating driving parts, a driven part, and a gear train operatively connecting said driven part with the oppositely rotating driving parts, said train of gears including a shiftable member having internal and external gear teeth adapted to mesh, respectively, with internal and external gears which constitute members of said train.

6. In a mechanical movement, a plurality of oppositely rotating driving parts, a driven part, and a gear train connecting said driven part with the oppositely rotating driving parts, said gear train including a shiftable member in eccentric relation to said driving and driven parts.

7. In a mechanical movement, a plurality of oppositely rotating driving parts and a driven part, a gear train operatively connecting the driven part with said driving parts, said gear train including an eccentrically positioned member which is shiftable relative to one of the driving parts and to the driven part, and means for retaining the eccentric shiftable member in mesh with the gears of said train, said member being shiftable relative to the gears of said train with which it is in mesh.

8. In a mechanical movement, the combination of oppositely rotating members one of which is provided with a rim mounted loosely thereon, means for imparting rotary motion to the loose rim of the one member and to the other member, a driven member, a gear train operable by said oppositely rotating members and coöperating with the driven member, locking dogs for making a rim fast with the member on which it is mounted, and a releasing device operable to free the dogs from said rim and simultaneously cause the member on which said rim is mounted to be held against rotation.

9. In a mechanical movement, a driving member provided with annularly disposed gear teeth and having a rim loosely mounted thereon, means coöperating with said driving member and with the rim thereof for retaining said member and rim against relative movement, in combination with a second driving member, a pinion mounted thereon with its axis of rotation exterior of axis of rotation of the second driving member, a shiftable toothed member in eccentric relation to the axis of rotation of the driving members and in engagement with the teeth on the first mentioned driving member and the pinion on the second driving member whereby the rotation of the driving members imparts rotation to said pinion, and a driven member in mesh with the pinion and adapted to receive rotation therefrom.

In testimony whereof I have signed my name to this specification in the presence of two subscribing witnesses.

ELMER SCHOONMAKER.

Witnesses:
H. I. BERNHARD,
M. C. POWELL.

Copies of this patent may be obtained for five cents each, by addressing the "Commissioner of Patents, Washington, D. C."